(12) United States Patent
Skoog et al.

(10) Patent No.: US 8,147,922 B2
(45) Date of Patent: Apr. 3, 2012

(54) COMPOSITION AND METHOD FOR A THERMAL COATING SYSTEM

(75) Inventors: Andrew Jay Skoog, West Chester, OH (US); Jane Ann Murphy, Franklin, OH (US)

(73) Assignee: General Electric Company, Schenectady, NY (US)

( * ) Notice: Subject to any disclaimer, the term of this patent is extended or adjusted under 35 U.S.C. 154(b) by 216 days.

(21) Appl. No.: 12/562,527

(22) Filed: Sep. 18, 2009

(65) Prior Publication Data

US 2011/0070428 A1 Mar. 24, 2011

(51) Int. Cl.
*B05D 1/04* (2006.01)

(52) U.S. Cl. ................................ 427/470; 427/483

(58) Field of Classification Search ............. 427/470, 427/483
See application file for complete search history.

(56) References Cited

U.S. PATENT DOCUMENTS

| | | | |
|---|---|---|---|
| 5,759,932 A | 6/1998 | Sangetta et al. | |
| 5,985,368 A | 11/1999 | Sangeeta et al. | |
| 6,007,919 A | 12/1999 | Skoog et al. | |
| 6,165,600 A | 12/2000 | Ivkovich, Jr. et al. | |
| 6,177,186 B1 | 1/2001 | Skoog et al. | |
| 6,210,791 B1 | 4/2001 | Skoog et al. | |
| 6,261,694 B1 | 7/2001 | Iacovangelo | |
| 6,294,261 B1 | 9/2001 | Sangeeta et al. | |
| 6,296,910 B1 * | 10/2001 | Choy et al. ................. | 427/475 |
| 6,379,804 B1 | 4/2002 | Ackerman et al. | |
| 6,465,090 B1 * | 10/2002 | Stowell et al. ............. | 428/325 |
| 6,485,590 B1 | 11/2002 | Ivkovich, Jr. et al. | |
| 6,827,969 B1 * | 12/2004 | Skoog et al. .............. | 427/142 |
| 7,090,894 B2 | 8/2006 | Carper et al. | |
| 7,094,446 B2 | 8/2006 | Ackerman et al. | |
| 7,250,192 B2 | 7/2007 | Skoog et al. | |
| 7,313,909 B2 | 1/2008 | Skoog et al. | |
| 7,368,164 B2 | 5/2008 | Stowell et al. | |
| 7,473,331 B2 | 1/2009 | Ivkovich, Jr. et al. | |
| 7,544,396 B2 | 6/2009 | Buczek et al. | |
| 2007/0104886 A1 | 5/2007 | Buczek et al. | |
| 2009/0148614 A1 | 6/2009 | Buczek et al. | |

FOREIGN PATENT DOCUMENTS

| EP | 1 609 885 A1 | 12/2005 |
|---|---|---|
| EP | 1 700 929 A1 | 9/2006 |

OTHER PUBLICATIONS

EP 10 17 5416 European Search Report and Written Opinion, Dec. 15, 2010.

* cited by examiner

*Primary Examiner* — Frederick Parker
(74) *Attorney, Agent, or Firm* — Dority & Manning, P.A.

(57) ABSTRACT

A thermal coating includes a substrate, a first coating layer, and a second coating layer. The substrate is selected from the group consisting of superalloys and ceramic matrix composites. The first coating layer comprises an alumina powder, a silica binder, and at least one additive selected from either a first group or a second group. The second coating layer comprises at least one of zinc titanate or cerium oxide. A method for applying a thermal coating system includes spraying a bond coat mixture onto a substrate using a liquid electrostatic sprayer. The bond coat mixture comprises an alumina powder, a silica binder, and at least one additive selected from either a first group or a second group. The method further includes applying a top coat mixture onto the bond coat mixture, wherein the top coat mixture comprises at least one of zinc titanate or cerium oxide.

13 Claims, 2 Drawing Sheets

COMPOSITION AND METHOD FOR A THERMAL COATING SYSTEM

FIELD OF THE INVENTION

The present invention pertains to thermal barrier coatings applied to protect components in high temperature environments. In particular, the present invention describes a composition and method for applying a thermal coating system.

BACKGROUND OF THE INVENTION

Systems located or operated in high temperature environments often include thermal barrier coatings (TBCs) on components to reflect heat and prevent the components from absorbing heat. For example, jet engines and gas turbines include combustors and turbines designed to operate in very demanding high temperature and pressure environments. As a result, many components, such as combustor liners, turbine blades, turbine casings, and rotors routinely operate in high temperature environments that approach or exceed the melting temperature of the constituent elements included in the components. A TBC applied to the surface of these components allows the components to operate at increasingly higher temperatures and/or with increased intervals between maintenance cycles.

The underlying components are typically designed to operate for extended periods in the structurally demanding high temperature and/or pressure environments. Superalloys such as Rene 80, Rene N4, and other nickel-based superalloys are commonly used in the underlying components. These superalloys may contain, by weight percent, 10 to 80 percent nickel, 5 to 22 percent chromium, up to 10 percent molybdenum, up to 5.5 percent titanium, up to 6.5 percent aluminum, up to 3 percent columbium, up to 9 percent tantalum, up to 15 percent tungsten, up to 2 percent hafnium, up to 1 percent rhenium, up to 1.5 percent vanadium, up to 40 percent cobalt, and up to 6 percent iron.

Ceramic matrix composites (CMCs) may also be selected for use in the underlying components Examples of commonly used CMCs include zirconia-based ceramics, alumina-based ceramics, magnesia-based ceramics, and ceramic composites such as alumina-silica (GE Gen 4), or a refractory material with, for example, silicon carbide, silicon nitride, alumina, silica, and/or calcia.

A suitable TBC applied to the underlying component should include one or more of the following characteristics: low emissivity or high reflectance for heat, particularly infrared heat having a wavelength of 0.5 to 60 micrometers; a smooth finish; and good adhesion to the underlying component. For example, thermal barrier coatings known in the art include metal oxides, such as zirconia ($ZrO_2$), partially or fully stabilized by yttria ($Y_2O_3$), magnesia (MgO), or other noble metal oxides. The selected TBC may be deposited by conventional methods using air plasma spraying (APS), low pressure plasma spraying (LPPS), or a physical vapor deposition (PVD) technique, such as electron beam physical vapor deposition (EBPVD), which yields a strain-tolerant columnar grain structure. The selected TBC may also be applied using a combination of any of the preceding methods to form a tape which is subsequently transferred for application to the underlying substrate, as described, for example, in U.S. Pat. No. 6,165,600, assigned to the same assignee as the present invention.

The thermal barrier coatings described above have coefficients of thermal expansion that are significantly lower than the coefficients of thermal expansion of the underlying components. As a result, cyclic thermal stresses incident to repetitive heating and cooling of the system components disrupts the adhesion between the TBC and the underlying substrate, leading to spalling of the coating system.

A bond coat may be used between the TBC and the underlying substrate to improve the adhesion between the TBC and the underlying substrate. The bond coat may be formed from an oxidation-resistant diffusion coating such as a diffusion aluminide or platinum aluminide, or an oxidation-resistant alloy such as MCrAlY (where M is iron, cobalt and/or nickel). Aluminide coatings are distinguished from MCrAlY coatings, in that the former are intermetallics, while the latter are metallic solid solutions. U.S. Pat. No. 6,210,791, assigned to the same assignee as the present invention, describes one such bond coat applied between the TBC and the underlying substrate that substantially improves adhesion between the TBC and the underlying substrate. The bond described therein is an alumina and silica mixture in an alcohol solvent.

The thermal barrier coatings, with our without a bond coat to improve adhesion, typically require some type of post-application drying or heating at 500 to 2000 degrees Fahrenheit to sinter and/or stabilize the coating system. The application and post-application curing produces volatile organic compounds (VOCs) which may exceed current environmental, health, and safety limits for VOC emissions. To reduce VOC emissions during the application and post-application curing, the thickness of the TBC and/or bond coat may be reduced. However, the thinner TBC and/or bond coat results in a corresponding decrease in the thermal reflection of the thermal barrier.

Therefore, the need exists for an improved thermal coating system to protect system components from excessive heat. Ideally, the thermal coating system will have low emissivity or high reflectance for heat, particularly infrared heat having a wavelength of 0.5 to 60 micrometers. In addition, the thermal coating system should be able to be easily applied so as to produce a smooth finish surface that adheres to the underlying substrate component without producing excessive VOCs during the application or post-application curing.

BRIEF DESCRIPTION OF THE INVENTION

Aspects and advantages of the invention are set forth below in the following description, or may be obvious from the description, or may be learned through practice of the invention.

One embodiment of the present invention is a thermal coating system. The thermal coating system includes a substrate, a first coating layer applied to the substrate, and a second coating layer applied to the first coating layer. The substrate is selected from the group consisting of superalloys and ceramic matrix composites. The first coating layer comprises an alumina powder, a silica binder, and at least one additive selected from either a first group or a second group. The first group consists of toluene, zylene, cellosolve acetate, EE acetate, and mineral spirits. The second group consists of methyl ethyl ketone, methyl isobutyl ketone, lacquer thinner, and acetone. The second coating layer comprises at least one of zinc titanate or cerium oxide.

Another embodiment of the present invention is a method for applying a thermal coating system. The method includes applying a first charge to a bond coat mixture, wherein the bond coat mixture comprises an alumina powder, a silica binder, and at least one additive selected from either a first group or a second group. The first group consists of toluene, zylene, cellosolve acetate, EE acetate, and mineral spirits. The second group consists of methyl ethyl ketone, methyl isobutyl ketone, lacquer thinner, and acetone. The method further includes applying a second charge to a substrate, wherein the second charge has an opposite polarity of the first charge, and spraying the bond coat mixture onto the substrate. The method also includes applying a top coat mixture onto the bond coat mixture, wherein the top coat mixture comprises at least one of zinc titanate or cerium oxide.

A further embodiment of the present invention is a method for applying a thermal coating system that includes spraying a bond coat mixture onto a substrate using a liquid electrostatic sprayer. The bond coat mixture comprises an alumina powder, a silica binder, and at least one additive selected from either a first group or a second group. The first group consists of toluene, zylene, cellosolve acetate, EE acetate, and mineral spirits. The second group consists of methyl ethyl ketone, methyl isobutyl ketone, lacquer thinner, and acetone. The method further includes applying a top coat mixture onto the bond coat mixture, wherein the top coat mixture comprises at least one of zinc titanate or cerium oxide.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
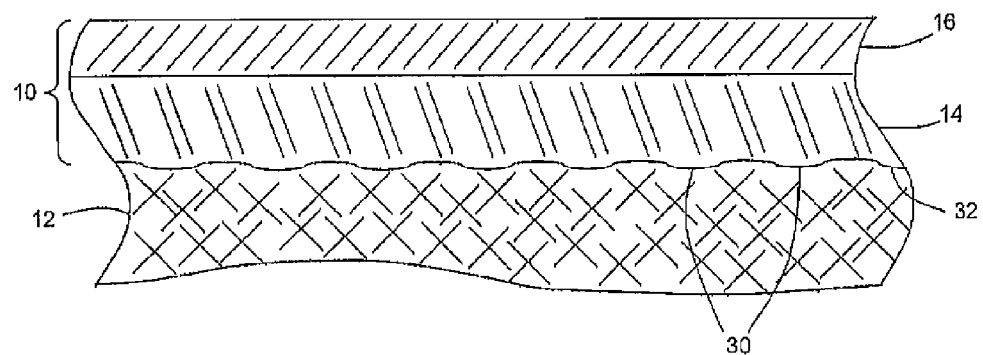
FIG. 1 provides a cross-sectional view of one embodiment of a coating system within the scope of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 shows a cross-sectional view of a thermal coating system 10 applied to a substrate 12 according to one embodiment of the present invention. In this particular embodiment, the thermal coating system 10 includes first and second coating layers referred to respectively as a bond coat mixture 14 and a top coat mixture 16.

The substrate 12 may be any material composition suitable for use in a high temperature environment. For example, superalloys and ceramic matrix composites as previously described are frequently selected for use in high temperature environments because of their suitable strength, ductility, and other physical characteristics.

The first layer or bond coat mixture 14 is applied to the substrate 12 and provides tight adhesion between the substrate 12 and any additional layers. The bond coat mixture 14 may be a modification of the bond coat described in U.S. Pat. No. 6,210,791, the entirety of which is herein incorporated by reference for all purposes. As described therein, the bond coat mixture 14 may be metallic, non-metallic, or a combination thereof, depending on the underlying substrate, and may include alumina powder, such as aluminum oxide, with a silica binder. An evaporable solvent, typically ethanol or isopropyl alcohol, is added to the bond coat mixture 14 to achieve the desired consistency. A suitable thickness for the bond coat mixture 14 may be approximately 0.5 to 8 mils (0.0005-0.008 inches), depending on the method of application and design needs.

To reduce the amount of VOCs generated during the application and drying, the bond coat mixture 14 may be applied using liquid electrostatic spraying (LES) techniques. In LES applications, an electrical charge is applied to the material being deposited, and a ground or opposite electrical charge is applied to the substrate. The charged material is then sprayed onto the substrate, and the polar attraction between the charged material and the substrate results in an increased deposit efficiency of the material onto the substrate with significantly less overspray and waste. The increased deposit efficiency produces a more uniform coverage, allowing the application of thinner layers of the material to the substrate to provide the same or better performance. As a result, LES applications provide significant cost savings of materials compared to conventional application techniques. In addition, the thinner application of the materials results in lower VOC emissions during both the application and the subsequent curing.

The electrical conductivity of the bond coat mixture 14 may need to be adjusted to obtain a desired particle size that allows the use of LES and improves the deposit efficiency. Additives such as toluene, zylene, cellosolve acetate, EE acetate, and mineral spirits may be added to the bond coat mixture 14 to make the mixture less electrically conductive and prevent agglomeration of the bond coat mixture 14 during spraying. Conversely, additives such as methyl ethyl ketone (MEK), methyl isobutyl ketone (MIBK), lacquer thinner, and acetone may be added to the bond coat mixture 14 to make the mixture more electrically conductive.

Figure 2:
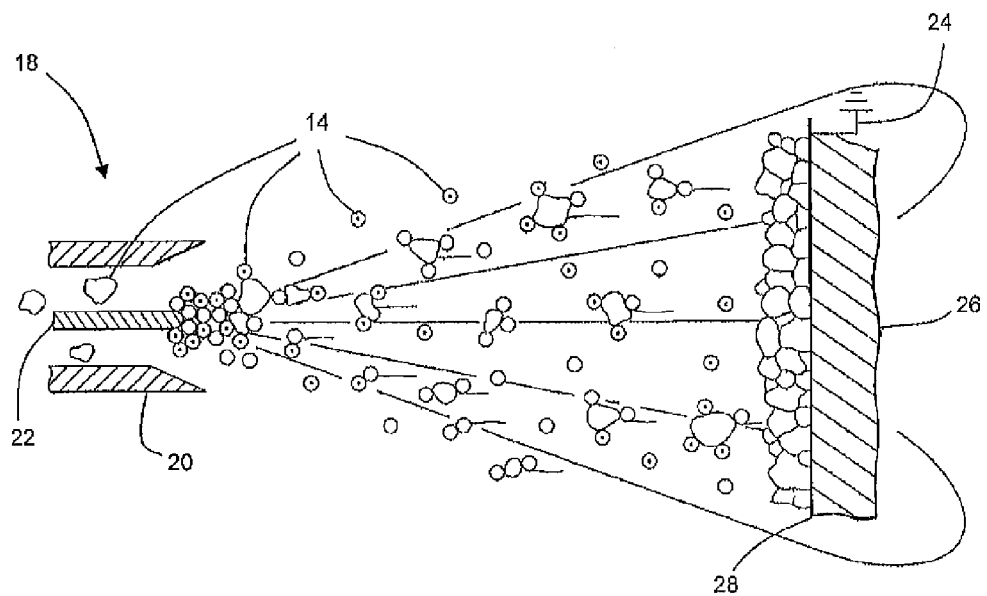
FIG. 2 illustrates liquid electrostatic spraying of a coating system within the scope of the present invention.

FIG. 2 illustrates an application of the bond coat mixture 14 using LES. A powder spray gun 18, such as a Nordson Kinetix air spray system sold by Nordson Corporation, Westlake, Ohio, includes a nozzle 20 with an electrode 22. An opposite charge or ground 24 is applied to a substrate 26. As the spray gun 18 propels the bond coat mixture 14 through the nozzle 20, the electrode 22 applies an electrical charge to the bond coat mixture 14. The charged bond coat mixture 14 flows to the oppositely charged or grounded substrate 26 where the polar attraction between the charged bond coat mixture 14 and substrate 26 deposits the bond coat mixture 14 uniformly on a surface 28 of the substrate 26. The magnitude of the electrical potential between the charged bond coat mixture 14 and the oppositely charged substrate 26 may be adjusted to increase or decrease the deposition rate on the substrate surface 28, depending on the desired thickness of the application.

The use of nano-sized particles as the constituent elements in the bond coat mixture 14 further improves the benefits of LES. For example, LES application of nano-sized particles having an average diameter of less than approximately 500 nanometers may readily achieve uniform thicknesses of the bond coat mixture 14 as low as approximately 0.5 mils (0.0005 inches). A thinner application of the bond coat mixture 14 produces several benefits. For example, a thinner bond coat mixture 14 will have a correspondingly smaller change in temperature across the bond coat mixture 14, resulting in better adhesion to the substrate 26. In addition, the nano-sized particles will produce a more tightly packed and dense layer that increases the resistance of the bond coat mixture 14 to erosion.

Referring back to FIG. 1, the thinner application of the bond coat mixture 14 using LES may not adequately cover all imperfections 30 in the surface 32 of the substrate 12. As a result, an additional undercoat layer (not shown) may be included between the bond coat mixture 14 and the substrate 12. The undercoat layer may comprise the same bond coat as previously described in U.S. Pat. No. 6,210,791. That is, the undercoat layer may comprise an alcohol mixture of alumina powder, such as aluminum oxide, with a silica binder. The undercoat layer may be applied using conventional application techniques known in the art. For example, the undercoat layer may be applied as a slurry spray, using air plasma spraying (APS), low pressure plasma spraying (LPPS), or physical vapor deposition (PVD) techniques such as electron beam physical vapor deposition (EBPVD). If needed, the undercoat layer is applied to a thickness of approximately 1 to 8 mils (0.001-0.008 inches) to fill in any imperfections 30 in the surface 32 of the substrate 12. For applications in which the substrate surface 32 is sufficiently smooth, the undercoat layer may be reduced in thickness or omitted entirely.

The top coat mixture 16 is located on top of the bond coat mixture 14. The combination of the bond coat mixture 14 and top coat mixture 16 provides the desirable smooth, wear, and reflective characteristics of the thermal coating system 10. Specifically, a smooth outermost surface of the thermal coating system 10 promotes improved aerodynamics across the surface which may be important in various applications. The surface roughness of the top coat mixture 16 is preferably less than approximately 60 micrometers Ra and potentially less than 20 micrometers Ra. In addition, the bond coat mixture 14 tightly adheres the top coat mixture 16 to the substrate 12 to resist wear or spalling even after numerous thermal cycles. Lastly, the top coat mixture 16 possesses the desired reflectance characteristics, particularly for infrared heat having a wavelength between 0.5 and 60 micrometers, to protect the substrate 12 from heat in a high temperature environment.

The top coat mixture 16 may be comprised of zinc titanate or cerium oxide to provide the desired heat reflectance characteristics of the thermal coating system 10. Suitable substitutes that may also provide the desired heat reflectance characteristics include barium titanate, yttrium oxide, dysprosium oxide, erbium oxide, europium, lanthanum oxide, lutetium oxide, thorium oxide, tungsten oxide, barium stannate, and barium tungstate, many of which may be supplied by Nano-Tek Technologies, Ltd.

The top coat mixture 16 may be applied using conventional application techniques known in the art. For example, the top coat mixture 16 may be wetted and layered on top of the bond coat mixture 14 as a slurry spray, using air plasma spraying (APS), low pressure plasma spraying (LPPS), or physical vapor deposition (PVD) techniques such as electron beam physical vapor deposition (EBPVD). The thickness of the top coat mixture 16 depends on the desired heat reflectance and application method and typically ranges from approximately 1 to 10 mils (0.001-0.010 inches).

In particular embodiments of the present invention, the thermal coating system 10 may be applied to the substrate 12 using a tape process as described in U.S. Pat. No. 6,165,600 and assigned to the same assignee as the present invention. In this process, compositions of the bond coat mixture 14 and/or top coat mixture 16 and/or optional undercoat layer as described above may be cast on a tetrafluoroethylene sheet. After the solvent evaporates from the compositions, the dried compositions are removed from the tetrafluoroethylene sheet and transferred to the substrate 12 to form the thermal coating system 10. Pressure may then be applied to the thermal coating system 10 to mechanically bond the thermal coating system 10 to the substrate 12.

Regardless of the application method, whether directly onto the substrate 12 or using the tape process as previously described, the thermal coating system 10 may be heated or cured after application to the substrate 12. An autoclave, oven, or similar device may be used to heat the thermal coating system 10 at a temperature of between 500 and 2,000 degrees Fahrenheit. The heat removes the binders and remaining solvent and sinters the thermal coating system layers 14, 16. The sintering forms both chemical and mechanical bonds both in the thermal coating system layers 14, 16 and with the substrate 12. Alumina in the substrate 12 mixes with the molten bond coat mixture 14 and raises the melting point of the thermal coating system 10. The melting point of the resulting thermal coating system 10 may thus be increased from approximately 1,500 degrees Fahrenheit to approximately 1,950 degrees Fahrenheit or higher, depending upon the actual composition of the substrate 12. The increased melting point of the thermal coating system 10 allows the substrate to be exposed to higher temperatures, which, for jet engine and gas turbine applications, typically produces increased thermodynamic efficiency.

Figure 3:
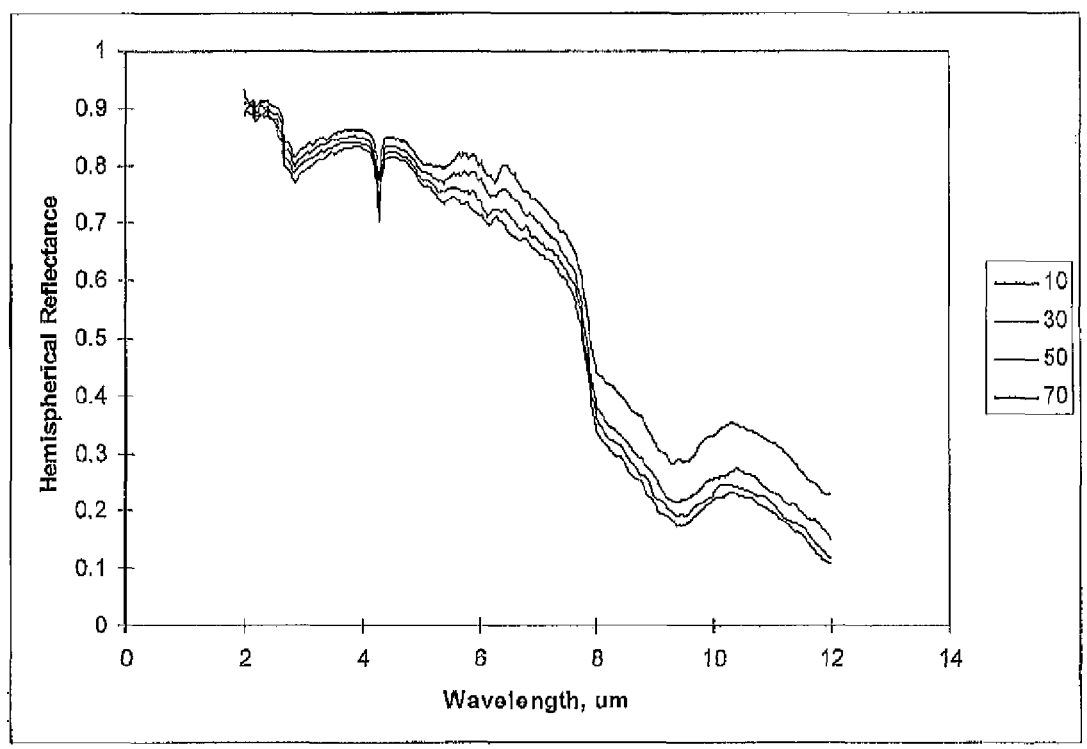
FIG. 3 is a graph of the reflective performance of one embodiment of a thermal barrier coating system within the scope of the present invention.

The duration of the heating varies from approximately 30 minutes to several hours, depending on the composition of the substrate 12, bond coat mixture 14, and top coat mixture 16. For example, FIG. 3 provides a graph of the reflective performance of one embodiment of a thermal barrier thermal coating system within the scope of the present invention. In this embodiment, the bond coat mixture 14 was cast on a tetrafluoroethylene sheet and transferred as a tape to the substrate 12. The top coat mixture 16 was then sprayed onto the bond coat mixture 14, and the combination was then heated at 1,650 degrees Fahrenheit for approximately 1 hour. The graph provided in FIG. 3 shows the resulting reflectance values for heat applied at various angles to the substrate.

It should be appreciated by those skilled in the art that modifications and variations can be made to the embodiments of the invention set forth herein without departing from the scope and spirit of the invention as set forth in the appended claims and their equivalents.

What is claimed is:

1. A method for applying a thermal coating system, comprising:
  a. applying a first charge to a bond coat mixture, wherein the bond coat mixture comprises an alumina powder and a silica binder;
  b. adjusting the electrical conductivity of the bond coat mixture using at least one additive selected from either a first group or a second group, wherein
    i. the first group consists of toluene, xylene, cellosolve acetate, EE acetate, and mineral spirits; and
    ii. the second group consists of methyl ethyl ketone, methyl isobutyl ketone, lacquer thinner, and acetone;
  c. applying a second charge to a substrate, wherein the second charge has an opposite polarity of the first charge;
  d. spraying the bond coat mixture onto the substrate; and e. applying a top coat mixture onto the bond coat mixture, wherein the top coat mixture comprises at least one of zinc titanate or cerium oxide.

2. The method of claim 1, further including curing the bond coat mixture and the top coat mixture in an environment having a temperature of at least 1,000 degrees Fahrenheit.

3. The method of claim 1, further including curing the bond coat mixture and the top coat mixture in an environment having a temperature of at least 1,500 degrees Fahrenheit for at least 30 minutes.

4. The method of claim 1, further including applying an undercoat layer between the bond coat mixture and the substrate, wherein the undercoat layer comprises an alumina powder and a silica binder.

5. The method of claim 4, further including curing the bond coat mixture, the top coat mixture, and the undercoat layer in an environment having a temperature of at least 1,500 degrees Fahrenheit.

6. The method of claim 4, further including curing the bond coat mixture, the top coat mixture, and the undercoat layer in an environment having a temperature of at least 1,500 degrees Fahrenheit for at least 30 minutes.

7. A method for applying a thermal coating system, comprising:
   a. spraying a bond coat mixture onto a substrate using a liquid electrostatic sprayer, wherein the bond coat mixture comprises an alumina powder and a silica binder,
   b. adjusting the electrical conductivity of the bond coat mixture using at least one additive selected from either a first group or a second group, wherein
      i. the first group consists of toluene, xylene, cellosolve acetate, EE acetate, and mineral spirits; and
      ii. the second group consists of methyl ethyl ketone, methyl isobutyl ketone, lacquer thinner, and acetone; and
   c. applying a top coat mixture onto the bond coat mixture, wherein the top coat mixture comprises at least one of zinc titanate or cerium oxide.

8. The method of claim 7, further including curing the bond coat mixture and the top coat mixture in an environment having a temperature of at least 1,000 degrees Fahrenheit.

9. The method of claim 7, further including curing the bond coat mixture and the top coat mixture in an environment having a temperature of at least 1,500 degrees Fahrenheit for at least 30 minutes.

10. The method of claim 7, further including applying an undercoat layer between the bond coat mixture and the substrate, wherein the undercoat layer comprises an alumina powder and a silica binder.

11. The method of claim 10, further including curing the bond coat mixture, the top coat mixture, and the undercoat layer in an environment having a temperature of at least 1,000 degrees Fahrenheit.

12. The method of claim 10, further including curing the bond coat mixture, the top coat mixture, and the undercoat layer in an environment having a temperature of at least 1,500 degrees Fahrenheit for at least 30 minutes.

13. The method of claim 7, further including spraying the bond coat mixture onto the substrate using a liquid electrostatic sprayer so that the thickness of the bond coat layer is less than 0.001 inches.

\* \* \* \* \*